United States Patent [19]

Oue et al.

[11] 4,043,647
[45] Aug. 23, 1977

[54] METHOD OF FORMING ALIGNMENT FILM FOR LIQUID CRYSTAL DISPLAY CELL

[75] Inventors: Michio Oue; Osamu Asai, both of Hitachi; Kishiro Iwasaki, Hitachiota; Hideaki Kawakami, Mito, all of Japan

[73] Assignee: Hitachi, Ltd., Japan

[21] Appl. No.: 713,581

[22] Filed: Aug. 11, 1976

[30] Foreign Application Priority Data

Aug. 15, 1975 Japan .................................. 50-98620

[51] Int. Cl.² .............................................. G02F 1/13
[52] U.S. Cl. .............................. 350/320; 350/160 LC; 427/109; 428/1
[58] Field of Search ......................... 350/160 LC, 320; 427/109; 428/1

[56] References Cited

U.S. PATENT DOCUMENTS

| 3,834,792 | 9/1974 | Janning | 350/160 LC |
| 3,967,883 | 7/1976 | Meyerhofer et al. | 350/160 LC |

*Primary Examiner*—Edward S. Bauer
*Attorney, Agent, or Firm*—Craig & Antonelli

[57] ABSTRACT

A liquid crystal display cell being capable of display with liquid crystal molecules aligned towards a predetermined direction has its display characteristics made greatly dependent on the properties of an alignment film coming into contact with the molecules of the liquid crystal. A louver having a predetermined angle is disposed between the substrate on which the alignment film is to be formed and an evaporation material source to pass a material evaporated from the evaporation material for deposition onto the substrate. The thus formed film exhibits a very great orientation controlling power of biaxial anisotropy. This forming method of the alignment film also allows the easy formation of the alignment film on a large substrate.

14 Claims, 15 Drawing Figures

X 72

X 72

METHOD OF FORMING ALIGNMENT FILM FOR LIQUID CRYSTAL DISPLAY CELL

BACKGROUND OF THE INVENTION

1. Field of the Invention

The present invention relates to a forming method of an alignment film for a liquid crystal display cell, which employs liquid crystals, for example, of smectic and nematic phases and effects display in response to a variation in orientation of their molecules.

2. Description of the Prior Art

An alignment contacts with molecules of a liquid crystal and serves to direct the arrangement of the liquid crystal molecules in a predetermined direction. For this purpose, a film has conventionally been utilized which is provided at its surface with a plurality of grooves arranged in a predetermined direction. Its particular manufacturing method is described in "SID International Symposium Digest of Technical Papers", P. 100 (1972). The groove can be made first by forming a substrate with an organic film at its surface and then by rubbing the surface of its film. The alignment film manufactured by the rubbing method has the drawback that its contact with a liquid crystal material for a long time causes a structure at its intersurface to be changed gradually with the result of irregularity in the orientation of the liquid crystal because the alignment film employs the organic film.

U.S. Pat. No. 3,834,792 of J. L. Jannig (Alignment film for a liquid crystal display cell) discloses a technique in which the alignment is formed by using an inorganic evaporation film instead of using the organic film. In this method, the substrate is so disposed in a vacuum evaporation container that its surface may be disposed at a low angle relative to an evaporation source to cause corpuscles flying downwardly from a predetermined oblique direction to be deposited on the surface of the substrate. The alignment film formed by the oblique vacuum evaporation method provides uniaxial anisotropy relative to the direction of the evaporation source and thus orients the liquid crystal molecules.

In the above-mentioned method, the evaporation source must be disposed in a very limited positional relation to the substrate in order to ensure a uniform orientation. Assuming, for example, that a distance from the evaporation source supposed to be a point to the substrate is 50 cm and an angle of evaporation for the oblique evaporation film is desired to be set in the tolerable range of 68 ± 2° in the oblique evaporation method, the substrate must be below about 40 mm in diameter in the direction of evaporation source. If the substrate is above 40 mm in diameter, then the angle of evaporation amounts at both its ends to more than 4°. This results in formation of no uniform orientation and in defective display.

The alignment film formed by the oblique vacuum evaporation method provides uniaxial anisotropy only in the direction of evaporation source, so that it does not exhibit sufficiently great orientation controlling power for the liquid crystal. For, for example, a liquid crystal with a shiff base

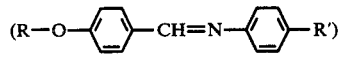

exhibiting an excellent orientation at its interface, the film exhibits good controlling ability, but for a liquid crystal with an azoxy base

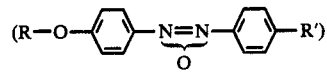

having a great response when used as a display cell, it exhibits no orientation controlling characteristics. In the chemical expression, R and R' show an alkyl group.

SUMMARY OF THE INVENTION

An object of the present invention is to provide a new method for forming an alignment film which comes into contact with a liquid crystal and orients the molecules of the liquid crystal strongly in a predetermined direction.

Another object of the present invention is to provide a method for forming an alignment film which comprises a deposited film covered with very fine projections, the surface of the film having at least biaxial anisotropy.

A further object of the present invention is to provide a method for manufacturing an alignment film exhibiting a uniform orientation over a wide area with high yield.

A still further object of the present invention is to provide a method for forming an alignment film for a twisted liquid crystal.

In order to achieve the above-mentioned objects, the alignment film is formed by the following means in accordance with the present invention. A substrate on the surface of which an alignment film is to be formed is disposed in a vacuum container together with an evaporation material source in an opposed relationship therewith.

A louver comprising a plurality of leaves with a predetermined angle of inclination is disposed between the substrate and the evaporation material source to pass evapoated particles through the gaps o the louver to the substrate. The determination of the pattern of the louver and the setting of a vacuum pressure to a predetermined value make it possible to form the alignment film for a liquid crystal having biaxial anisotopy.

BRIEF DESCRIPTION OF THE DRAWINGS

FIG. 2a is according to the present invention and 2b is according to an oblique vacuum evaporation.

DESCRIPTION OF THE PREFERRED EMBODIMENTS

A substrate on which an alignment film is formed is made of transparent glass, plastics or the like and has an electrode disposed at its one surface as required to supply liquid crystal molecules with a signal. If the electrode is provided, it is covered at its surface with another alignment film. It is, on the other hand, also possible to cause the electrode itself to serve as the alignment film.

Figure 1:
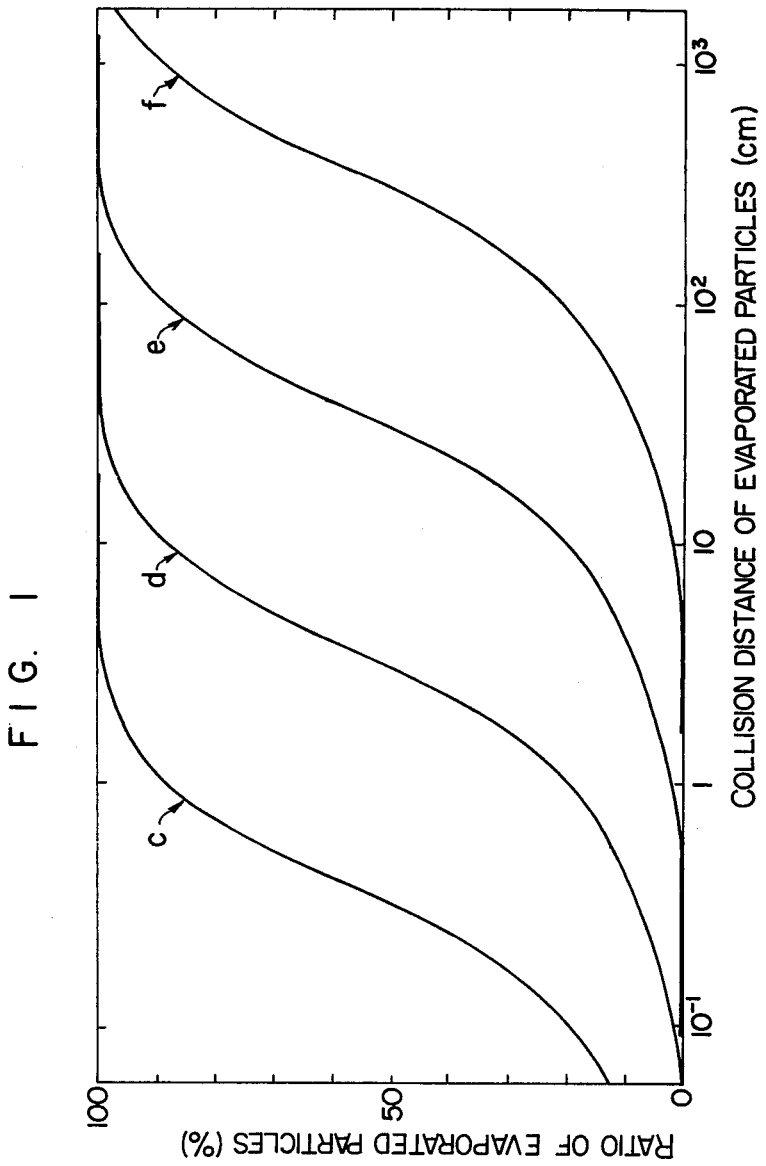
FIG. 1 is a graph showing the distribution of particles relative to the distance of collision of evaporated particles.

The substrate is disposed in a vacuum container in such a manner that its one surface on which the alignment film is to be formed opposes an evaporation source. The pressure within the container is reduced so that evaporated particles from the evaporation source reach the surface of the substrate. The degree of pressure reduction is so selected that the evaporated particles have a suitable mean free path. More specifically, the evaporation is carried out at vacuum pressures of 1 $\times$ 10$^{-2}$ to 5 $\times$ 10$^{-5}$ mmHg. The pressure less than 5 $\times$ 10$^{-5}$ mmHg leads to too elongated linear flying distance of the evaporated particles with the result of the remarkably reduced number of particles capable of reaching the surface of the substrate due to the obstruction in the presence of the louver. The pressure higher than 1 $\times$ 10$^{-2}$ mmHg, on the other hand, undesirably degradates the adhesion of the deposited film. FIG. 1 shows the results of the collision distance of the evaporated particles at pressures of 10$^{-2}$ to 10$^{-5}$ mmHg. In the graph, a curve $c$ is obtained at 10$^{-2}$ torr, a curve $d$ at 10$^{-3}$ torr, a curve $e$ at 10$^{-4}$ torr and a curve $f$ at 10$^{-5}$ torr. In the figure, the mean free path denotes a collision distance of the evaporated particles which amount to 60%. The atmospheric pressure suitable from the view-point of forming an alignment film of biaxial anisotropy is such a pressure at which the mean free path amounts to 2 to 50 cm. The pressure at which it amounts to 5 to 20 cm is most suitable from the view-points of operations and stability in quality of the film. The mean free path longer than 100 cm results in the formation of the liquid crystal with only uniaxial aniostropy with the orientation power of its molecules remarkably reduced, so that no alignment film that is intended according to the present invention is formed. It should be noted that the distance between the evaporation source and the surface of the substrate must be longer than the mean free path. A method for heating the evaporation source with a heater, or a method of emitting an electron beam or ion beam to evaporate the material of evaporation source is introduced to fly the particles from the evaporation source in the vacuum. One feature of the present invention is the ability of forming the alignment film by the use of a chemical vapor deposition method.

In the present invention, these methods are used to fly the particles in a random direction at reduced pressures in the vacuum container, some of the particles which have a desired angle of incidence relative to the substrate being selected fro irradiation to the substrate.

In the present invention, the angle of incidence of the particle is an angle measured from a normal (perpendicular plane) on the surface of the substrate.

The substrate of the evaporation source from which the alignment film is formed is non-metallic compounds such as silicon monooxide, silicon dioxide, calcium fluoride, magnesium fluoride, lithium fluoride, cerium fluoride, boron nitride, or metals and metallic compounds such as gold, chrome, titanium, titanium oxide, aluminum oxide, indium oxide, tin oxide, tungsten oxide, cerium oxide, lead fluoride, cadmium sulfide, lead sulfide, zinc sulfide, antimony sulfide, etc. There is a danger of causing an undesired reaction in response to the displacement of impurities in the liquid crystal to the interface of the electrode in the case where the liquid crystal display cell is used for a long time. When such a danger arises, an insulating alignment film is advantageously selected. For an alignment film which serves simultaneously as the electrode, indium oxide, tin oxide or the like is employed.

Figure 2A:
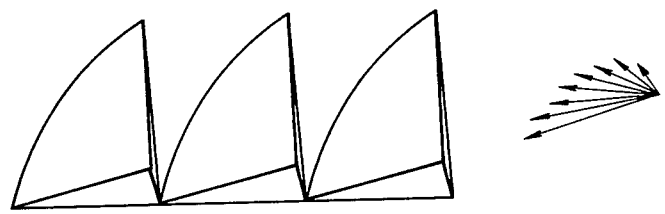
FIGS. 2a and 2b are model views of a deposited thin film.
Figure 2B:
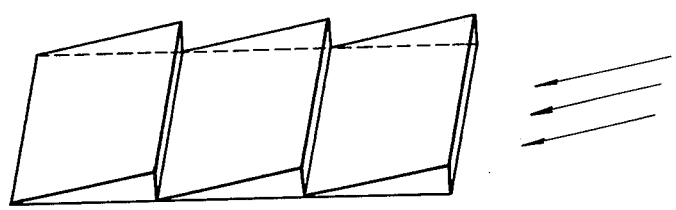

The fine model structure of the alignment film formed by the present invention is supposed as being shown in FIG. 2a. In other words, the particles in a direction of arrow are so deposited as to form one gently inclined surface, which intersects with two surfaces with a large angle of inclination with two edges defined. The anisotropy of the film is produced in the direction of these edges. On the other hand, the film formed by the vacuum oblique evaporation is considered as being in the form of steps as shown in FIG. 2b and exhibits the anisotropy along an edge intersecting at right angle with the intruding direction of the evaporated particles. It should be noted that the molecules of the liquid crystal are aligned in a direction of resultant vector of the anisotropies of the film.

The conditions under which the deposition as shown in FIG. 2a according to the present invention is formed should be such that most of the flying particles have angles of incidence ranging from 45° to 75° and some flying particles coexist therewith which have angles of inclination deviated by 10° to 60° including a primary angle of inclination.

Figure 3:
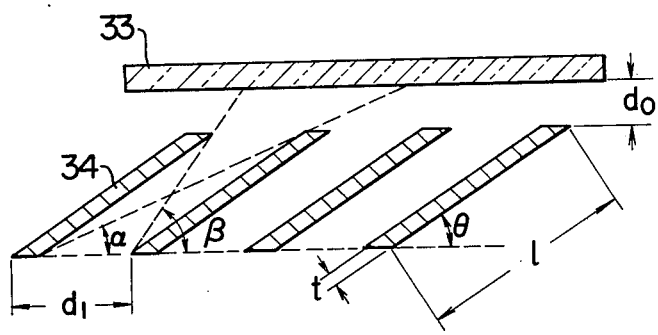
FIG. 3 is a cross-section showing a fundamental relation between a substrate and a louver.

A louver used to deposit on the surface of the substrate the evaporated particles having a predetermined angle of incidence as mentioned above basically includes a pattern and a positional relation relative to the surface of the substrate as shown in FIG. 3. Assume that $d_o$ is a distance of the substrate 33 from leaves 34 constituting the louver, $l$ a width of the leaf, $t$ its thickness, $\theta$ an angle of inclination of the leaf 34 relative to the surface of the substrate, $\alpha$ and $\beta$ minimum and maximum angles of inclination defined by two adjacent leaves, and $d_1$ an interval between the leaves. These values may be determined experimentally for optimum conditions on the basis of the following teaching.

The evaporated particles departing from the evaporation source collide with vapor molecules or with each other with the result of formation of variously directed groups of particles, which reach the entrance of the louver. The evaporated particles in some direction of component collide with the surface of the leaves and are interrupted as they pass through the louver. Thus, the particles having particular components are permitted to reach the surface of the substrate. The scattering of the particles at a time during which they pass through the louver results in weakened anisotropy of the film. As is apparent from FIG. 3, the particles which intrude to the substrate at an angle of α from the end of the leaf on the side of the evaporation source in the cross section of the louver have the longest flying distance, which is defined as being shorter than the mean free path. In other words, the shortest linear distance in a free space from the entrance of the louver to the surface of the substrate is always shorter than the mean free path of the evaporated particles. The relation between the mean free path (m.f.p.) and the louver is expressed by the following equation:

$$m.f.p. \geq \frac{l \cdot \sin\theta + d_o}{\sin\alpha} \quad (1)$$

The too short interval $d_o$ from the surface of the substrate to the louver causes the shadow of the leaves themselves to be projected on the surface of the substrate with the result that the substrate has no evaporation film formed at some positions of its surface. The interval $d_o$ is, therefore, given by the following expression:

$$d_o \geq \frac{t \cdot l}{2(d_1 - \frac{t}{\sin\theta})} \quad (2)$$

On the assumption of an angle δ of incidence of the evaporated particles relative to the substrate, the relation between the angle of incidence and α, β is such as $\alpha < (90 - \delta) \approx \theta < \beta$, where α and β are as follows:

$$\tan\alpha = \frac{l\sin\theta}{d_1 - \frac{t}{\sin\theta} + l\cos\theta} \quad (3)$$

$$\tan\beta = \frac{l\sin\theta}{l \cdot \cos\theta - (d_1 - \frac{t}{\sin\theta})} \quad (4)$$

Figure 4:
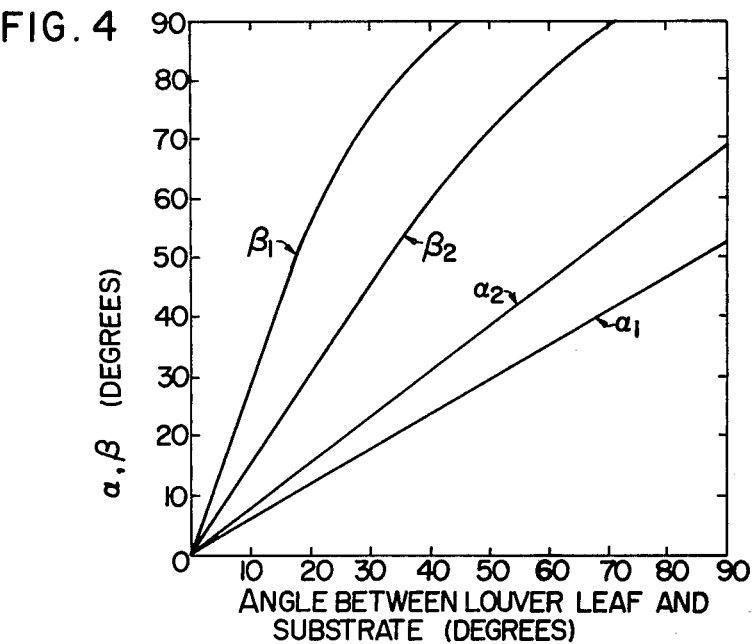
FIG. 4 is a graph showing a relation of an angle of view defined by the louver.

Therefore, the narrowing of the interval between the leaves by $$(d_1 - \frac{t}{\sin\theta}) \rightarrow 0,$$

or the widening of the width of leaf by $$l >> (d_1 - \frac{t}{\sin\theta})$$

cause both α and β to come near to θ, so that the difference between the maximum and minimum angles of incidence of the particles is made small. These conditions are shown in FIG. 4. $\alpha_1$ and $\beta_1$ are, respectively, the minimum and maximum angles of incidence when the thickness t of the leaf is 0.3 mm, the interval $d_1$ between the leaves is 15 mm and the width l of the leaf is 20 mm. The widened width l of the leaf to 40 mm allows the particles having angles of incidence between curves $\alpha_2$ and $\beta_2$ to reach the surface of the substrate.

The more number of particles are incident on the surface of the substrate at right angle therewith, the more reduced biaxial anisotropy appears in the formed alignment film. The pattern of the louver is, therefore, so determined that the angle β is below 90°.

The difference between the angles α and β (angle of view) below 10° results in the formation of a film whose properties are substantially the same as those formed by the vacuum oblique evaporation method with insufficient orientation controlling power. The angle of view above 60°, on the other hand, causes the formation of spot-like discontinuous orientation lines, called domains, when the film is mounted on the liquid crystal display cell. For this reason, the difference between the minimum and maximum angles α, β of incidence defined by two adjacent leaves should be between 10° to 60°. These domains are also easy to appear in such a case where the evaporation source is disposed on a normal line of the surface of the substrate, but disappear when the evaporation source is several degrees away from the normal. The minimum interval $d_1$ between the adjacent leaves is suitably on the order of 0.5 mm added to the leaf cross section ($t/\sin\theta$) from the viewpoint of formation of the film.

The angle δ of incidence of the particles relative to the substrate depends substantially upon the angle θ of inclination of the leaf. Since the angle of incidence is 45° to 75° as mentioned above, the angle θ of inclination of the leaf substantially ranges 45° to 15°.

There is no particular limitation of materials constituting the louver; for example, such materials as metals, plastics, paper, ceramics or the like can be used, which generate no harmful gas at the time of evaporation and have resistance against a present temperature.

The formed alignment film is 50 to 600 Å thick. The thinner film results in the exposure of portion of the substrate with poorer orientation of the liquid crystal while the thicker film also degrades the orientation because the aligned projections of the alignment film are destroyed. The film is preferably 200 = 50 Å thick.

The detailed examination along a line parallel to the leaf about properties of the biaxial anisotropy in the film formed according to the present invention shows that there is a difference between angles of orientation, at which the liquid crystal is oriented, on a portion near to the normal from the evaporation source and on a portion spaced far away from it. It is further of course that the deposited film is thinner as it is farther away from the evaporation source.

Figure 5:
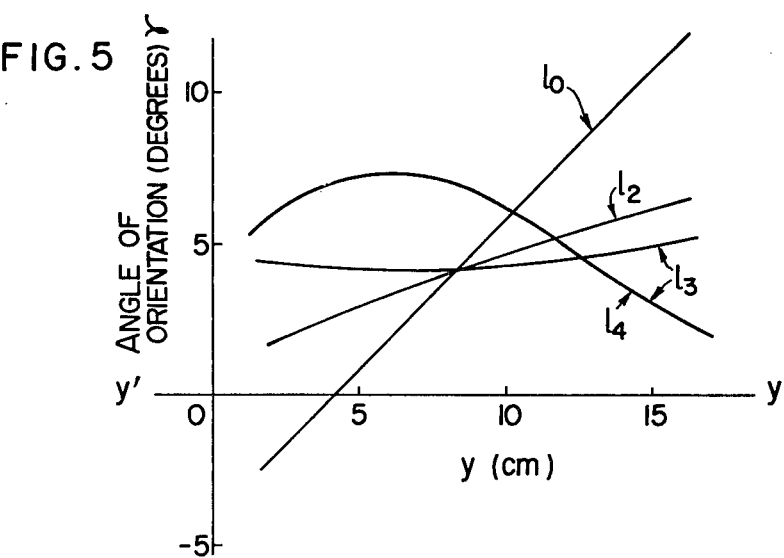
FIG. 5 is a graph showing a relation between the pattern of a lateral lattice and an angle of orientation.

The angle of orientation of the liquid crystal varies substantially linearly on the line parallel to the leaf as shown in FIG. 5. In this figure, the angle γ of orientation is shown as being measured from an axis (y'-y) in a plane (x-x') - (y-y') in FIG. 6.

Such a variation in angle of orientation on the axis (y-y') of the alignment film can advantageously be cancelled in the liquid crystal display cell in combination with a set of alignment films having the same properties. There is, however, a liquid crystal display cell in which a large sheet of alignment film is divided into small units, which are paired for display. For such a display cell, the units whose angle γ of orientation is greatly different from each other are sometimes made paired and generate the irregularity of the characteristics.

Figure 6:
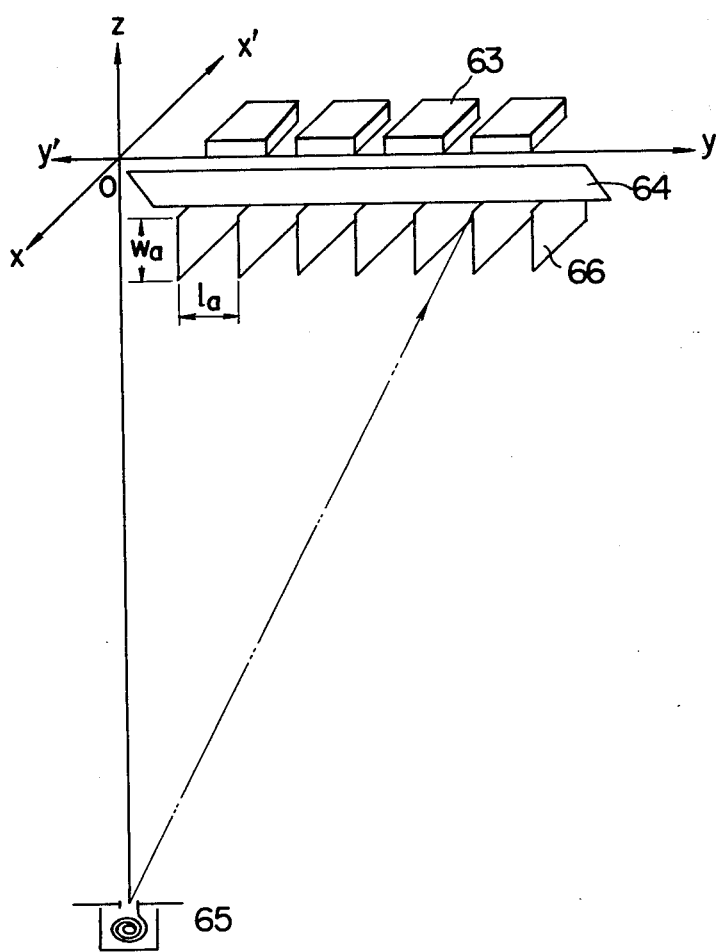
FIG. 6 is a perspective view showing a positional relation among the substrate, louver, lateral lattice and a source of evaporation.

In this respect, screen plates (hereinafter referred to as lateral lattice 66) are provided which intersect with each leaf 64 of the louver at right angles as shown in FIG. 6. This makes it possible to reduce the change in angle of orientation on the axis (y-y') as mentioned above. The lateral lattice may be provided between the louver and the evaporation source 65, beteen the lourver and the surface of the substrate, or within the louver.

Particularly, the combination of the louver and the lateral lattice made integral therewith provides an oblique lattice or hive-like louver and increases a mechanical strength. FIG. 5 shows curves obtained by the measurement of the angle of orientation on the axis ($y'-y$) versus a ratio $w_a/l_a$ of the lattice width $w_a$ to the lattice interval $l_a$ of the lateral lattice 66. In the figure, $l_o$ represents no lateral lattice, $l_2$ the lattice of $w_1/l_a = 2$, $l_3$ the lattice of $w_a/l_a = 3$ and $l_4$ the lattice of $w_a/l_a = 4$. The lateral lattice having a ratio $w/l$ of 1 to 5 is effectively provided.

Figure 7:
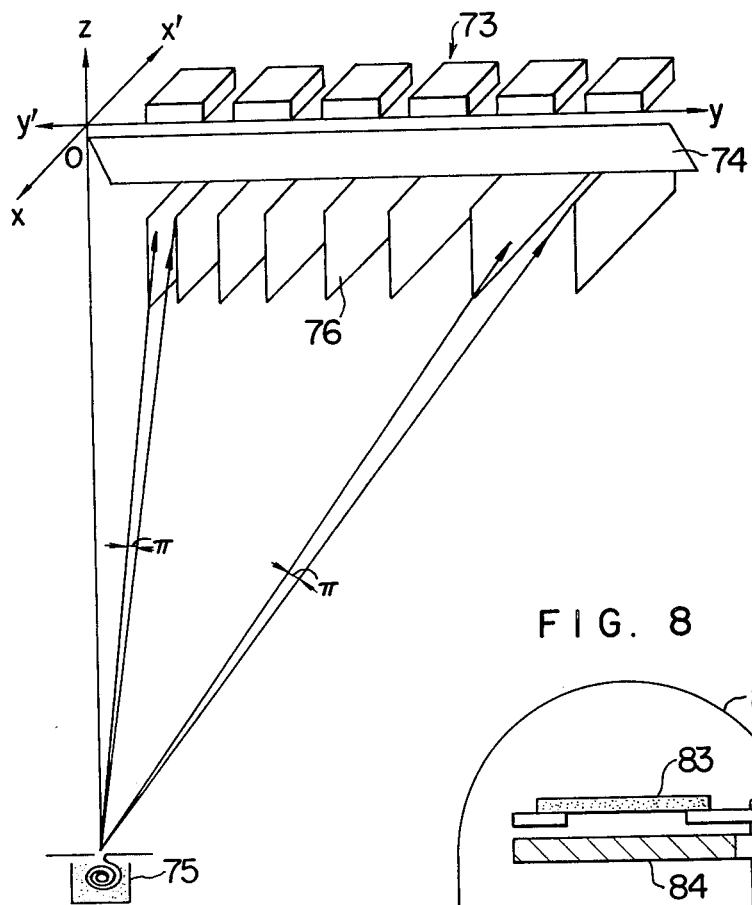
FIG. 7 is a perspective view showing one example of the lateral lattice.

The widening of the lattice interval at positions spaced farther away from the evaporation source or the widening of the lattice width at positions nearer to the evaporation source leads to the uniformed deposition on the axis ($y'-y$). FIG. 7 shows a deposition method using the lateral lattice for keeping the deposition uniform on the axis ($y'-y$). In the figure, evaporated particles departing from an evaporation source 75 pass through a lateral lattice 76 and a louver 74 to a substrate 73. In this figure, the evaporated particles are shown as travelling straight in order to show the constant evaporation. Actually, however, the travel of the particles so deviates that they may be not interrupted by the lateral lattice. As a result, the surfactant is by no means discontinuous.

EMBODIMENT 1

Figure 8:
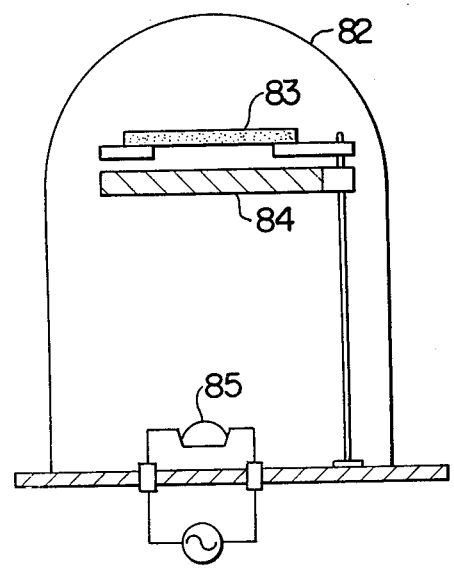
FIG. 8 is a cross-section showing a device for forming an alignment film, illustrating one embodiment.
Figure 9:
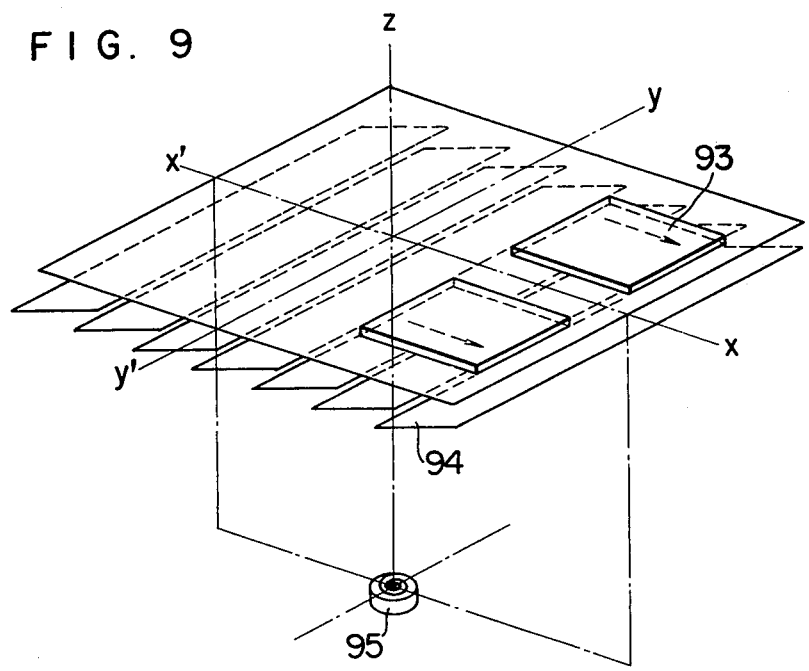
FIG. 9 is a perspective view showing a positional relation between the substrate and the source of evaporation.

A substrate 83 of glass (2.5 mm thick, 50 mm long and 40 mm wide) formed thereon with a transparent conductive film of $In_2O_3$ by evaporation was washed at its surface with trichloroethylene and acetone to remove therefrom fat and dust and then disposed in a vacuum-evaporation container (bell jar) 82 as shown in FIG. 8, and SiO was evaporated at an air pressure of $5 \times 10^{-4}$ torr. Powders 85 of SiO was contained in a crucible of tantalum and heated by a spiral heater made of tungsten for evaporation. The distance between the evaporation source 85 and a louver 84 was 40 cm, and the distance $d_o$ between the louver 84 and the glass substrate 83 was 12 mm. Leaves constituting the louver were made of stainless steel plates each 0.5 mm thick and 20 mm wide with the leaf angle $\theta$ of 15° and leaf interval of 15 mm. In this example, $\alpha$ is 9° and $\beta$ is 42°. The detailed arrangement of the substrate in FIG. 8 is illustrated in FIG. 9, in which there are shown a substrate 93, louver 94 and evaporation source 95.

Two glass substrates evaporated with SiO by the above-mentioned method were arranged with their surfaces made inside on which the evaporation film of SiO was formed and with a right-angled direction of evaporation (direction $\overrightarrow{x'-x}$) shown by arrows in FIG. 7 to provide a liquid crystal cell in combination with a spacer of 9 $\mu$ thick polyethylene terephthalate film. The cell was sealed on its periphery with an adhesive (epoxy resin; Epotic, brand name of Epoxy Technology Incorporated). The liquid crystal injected to the cell was made of compounds of shiff base of propyl benzylidene cyano aniline and hexyl benzylidene cyano aniline. The injection was carried out within the vacuum bell jar in such a manner that the liquid crystal was heated to an isotropic state by means of an infrared lamp. After the injection, the liquid crystal was gradually cooled back to a liquid crystal state.

In order to observe the optical state of the above-mentioned liquid crystal cell, a polarizer and an analyzer are disposed before and behind the liquid crystal cell, respectively. The polarizer had its polarization direction arranged substantially at right angle with that of the analyzer, and substantially in an alignment with the evaporation direction on the substrate of the liquid crystal cell on the side of the polarizer. In this state, the liquid crystal cell was viewed to be uniformly bright from the side of the analyzer under light from a parallel white light source disposed on the side of the polarizer. The liquid crystal cell was, on the other hand, viewed to be uniformly dark under the above-mentioned conditions with the exception of the polarization direction of the analyzer, which was arranged to be substantially parallel to the polarization direction of the polarizer. It is because the emitted light is polarized by the polarizer and twisted 90° in polarization plane by the liquid crystal while it passes through the liquid crystal with the light being permitted to pass when its angle of polarization coincides with the polarization direction of the analyzer and with the light being interrupted when they are crossed.

Figure 10:
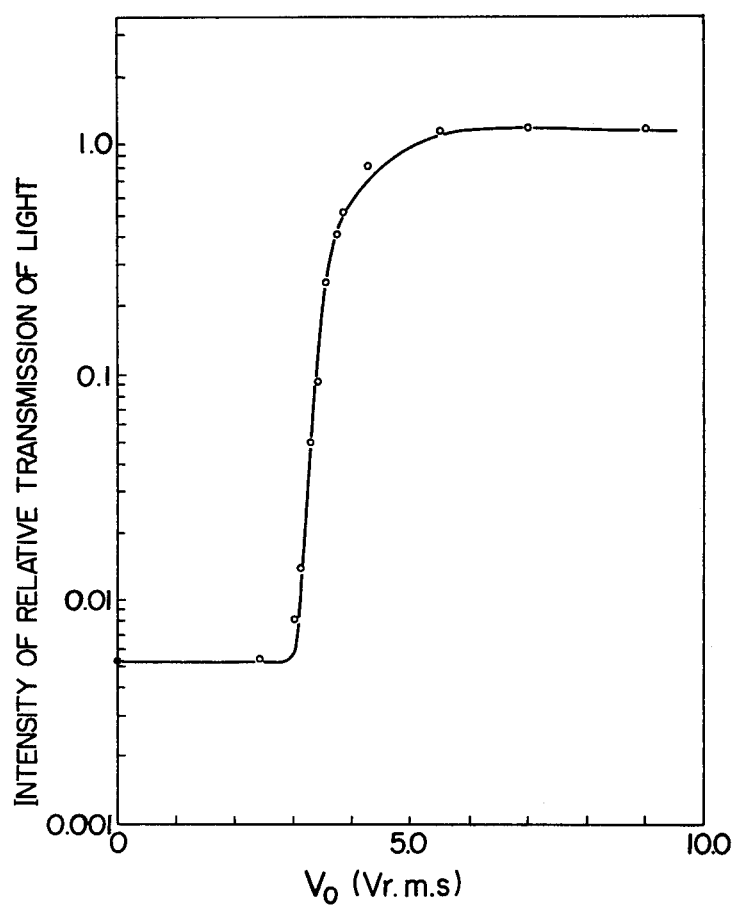
FIG. 10 is a graph showing a relation between a voltage applied to a liquid crystal display cell according to one embodiment and an intensity of transmitted light.

A rectangular AC voltage of 1 KHz was next applied across the two transparent conductive films respectively formed on the two sheets of substrate of the liquid crystal cell in order to measure the transmission of white light from a tungsten lamp at a temperature of 25° C by means of a photomultiplier tube and an X-Y recorder. These results are shown in FIG. 10. As is apparent from the figure, the liquid crystal cell exhibits excellent characteristics with a threshold voltage of about 3 V, a voltage of about 5 V at which the transmission of light is saturated and the contrast of 180.

EMBODIMENT 2

Figure 11:
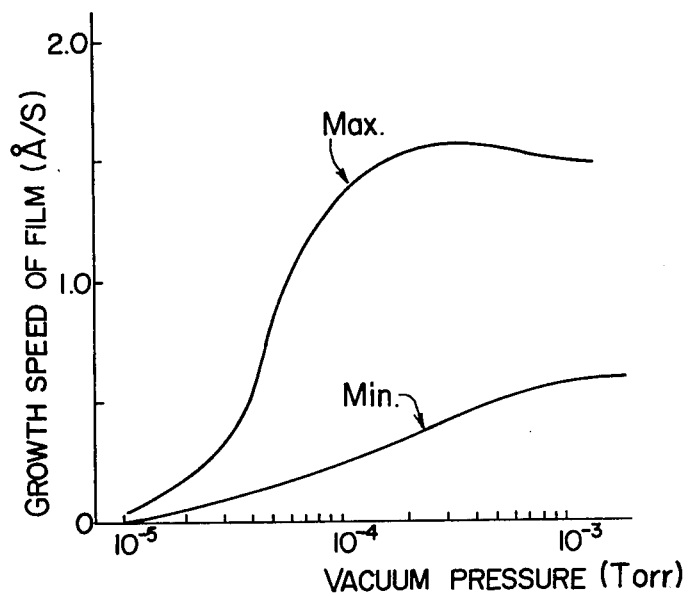
FIG. 11 is a graph showing a relation between a vacuum pressure and a deposit rate of the film.

A glass substrate formed with a transparent electrode was disposed in the vacuum evaporation container in a similar manner to that in the EMBODIMENT 1, and SiO was evaporated at nitrogen pressures of $10^{-2}$ to $10^{-6}$ Torr for 5 to 10 minutes. The thickness of the deposited film was measured by a surface roughness meter to measure the growth speed of the film, the results of which are shown in FIG. 11. As is apparent from the figure, the alignment film is grown due to the obstruction of the lourver so slowly at vacuum pressures below $10^{-5}$ Torr that it can be not formed. The alignment film of SiO 10 to 1000 A thick was formed according to the above-mentioned method, and a liquid crystal cell was constructed with the two films whose direction of evaporation is substantially perpendicular to each other in a manner similar to that as mentioned in Embodiment 1. The same liquid crystal as that in Embodiment 1 was filled in a similar manner.

The liquid crystal cell was disposed between the polarizer and analyzer in the same manner as that of Embodiment 1 to measure the transmissions of light by the photomultiplier when the polarization direction of the analyzer is substantially orthogonal and parallel to that of the polarizer and to derive therefrom a ratio of the transmissions of light. The liquid crystal was further viewed by means of an orthogonal Nicol under a polarization microscope. The results are shown in Table 1.

TABLE 1

| No. | Vacuum Pressure | Thickness of Film | Ratio of Transmissions of light | State of Orientation |
|---|---|---|---|---|
| 1 | $10^{-6}$ | <10 | ~20 | Random |
| 2 | $10^{-5}$ | <10 | ~20 | " |
| 3 | $5 \times 10^{-5}$ | 60 | 80 | TN orientation |
| 4 | $10^{-4}$ | 80 | 100 | " |
| 5 | $5 \times 10^{-4}$ | 80 | 100 | " |
| 6 | $5 \times 10^{-4}$ | 100 | 180 | " |
| 7 | $5 \times 10^{-4}$ | 200 | 190 | " |
| 8 | $5 \times 10^{-4}$ | 400 | 180 | " |
| 9 | $5 \times 10^{-4}$ | 600 | 80 | " |
| 10 | $5 \times 10^{-4}$ | 1000 | 0 | Longitudinal orientation |
| 11 | $10^{-3}$ | 200 | 190 | TN orientation |
| 12 | $10^{-3}$ | 1000 | 0 | Longitudinal orientation |
| 13 | $2 \times 10^{-2}$ | 100 | 180 | TN orientation |
| 14 | $10^{-2}$ | 50 | 80 | " |
| 15 | $10^{-2}$ | 100 | 100 | " |

TN (orientation): Twist-Nematic

EMBODIMENT 3

A glass plate formed with a transparent electrode was disposed within the vacuum evaporation container similarly as in Embodiment 1, and SiO was evaporated at vacuum pressures below $5 \times 10^{-4}$ Torr for ten minutes. The alignment film of SiO 400 A thick was formed according to the above-mentioned method, and the liquid crystal cell was constructed so that the directions of evaporation may be substantially orthogonal to each other in a manner similar to that as mentioned in Embodiment 1. The used liquid crystal contains a mixture having any ratio of composition of A (azoxy base) and B (shiff base) in combination with 5 to 10 by weight % of C (p-type additive). This is shown in Table 2.

The liquid crystal cell was disposed between the polarizer and analyzer in the same manner as that in Embodiment 1 to measure the transmissions of light by the photomultiplier when the polarization direction of the analyzer is substantially orthogonal and parallel to that of the polarizer and to derive therefrom a ratio of the transmissions of light. The liquid crystal was further viewed by means of an orthogonal Nicol under a polarizing microscope. The results are shown in Table 3.

Table 4 shows the results of measurement for reference in which a mixed liquid crystal of 100 portions of azoxy base and 30 portions of shiff base was sealed using alignment films formed at angles of evaporation of 60° to 82° by the conventional vacuum evaporation method. The direction of orientation was longitudinal with no display signals obtained.

TABLE 2

| Liquid Crystal | Components | Composition |
|---|---|---|
| A (Azoxy base) | $CH_3O-\langle \rangle -N=N(O)-\langle \rangle -C_2H_5$ | 40 % |
| | $CH_3O-\langle \rangle -N=N(O)-\langle \rangle -C_4H_9$ | 60 % |
| B (Shiff base) | $CH_3O-\langle \rangle -CH=N-\langle \rangle -C_4H_9$ | 33.3 % |
| | $C_2H_5O-\langle \rangle -CH=N-\langle \rangle -C_4H_9$ | 33.3 % |
| | $C_2H_5O-\langle \rangle -C=N-\langle \rangle -C_7H_{15}$ | 33.4 % |
| | $C_4H_9O-\langle \rangle -COO-\langle \rangle -NO_2$ | |
| C (p-Type additive) | $C_4H_9-\langle \rangle -COO-\langle \rangle -CN$ | |
| | $C_6H_{13}-\langle \rangle -\langle \rangle -CN$ | |

TABLE 3

| | Ratio of Components | | | Ratio of Transmissions of | State of |
|---|---|---|---|---|---|
| No. | A | B | C | Light | Orientation |
| 16 | 100 | 0 | 5 | ~100 | TN orientation |
| 17 | 100 | 10 | 10 | 130 | " |
| 18 | 100 | 20 | 10 | 180 | " |
| 19 | 100 | 30 | 10 | 210 | " |
| 20 | 100 | 40 | 10 | 210 | " |
| 21 | 100 | 50 | 10 | 210 | " |
| 22 | 100 | 60 | 10 | 210 | " |
| 23 | 100 | 70 | 10 | 210 | " |

TABLE 4

| Angle of Oblique Evaporation | Ratio of Components | | | Ratio of Transmissions of Light | State of Orientation |
|---|---|---|---|---|---|
| | A | B | C | | |
| 60° | 100 | 30 | 10 | 0 | Longitudinal orientation |
| 65° | 100 | 30 | 10 | 0 | " |
| 70°C | 100 | 30 | 10 | 0 | " |
| 82° | 100 | 30 | 10 | 0 | " |

EMBODIMENT 4

An electrode film of indium oxide was formed on a 16 mm long and 16 mm wide plate of quartz by an electron beam evaporation method. 64 Substrates thus formed were disposed within the vacuum bell jar. Adjacent the substrate there were disposed a louver and a lateral lattice whose direction is orthogonal to that of the louver. Each of the leaves constituting the louver has the angle of 30°, interval of 10 mm and width of 20 mm, and the lateral lattice has the lattice width of 20 mm and lattice interval of 10 mm. Magnesium fluoride was evaporated onto the substrate at a vacuum pressure of $5 \times 10^{-3}$ mmHg for five minutes. 64 sheets of alignment film thus formed were $200 \pm 70$ A thick on the average.

Two sheets of substrates were spaced 9, 6, 3 $\mu$m away from each other, between which a mixture liquid crystal of shiff base of propyl benzylidene cyano aniline and hexyl benzylidene cyano aniline was injected to provide a liquid crystal display cell. A predetermined optical system and signal circuit were provided to measure the properties of the display cell. The time of response till the operation as the display cell after the application of electrical signals was about 200 msec for the 9 $\mu$m interval between the substrates, about 120 msec for the 6 $\mu$m interval and 40 msec for the 3 $\mu$m interval.

For the alignment film formed by the conventional oblique vacuum evaporation method, the minimum interval between the substrates was 9 μm and the shortest time of response was about 200 msec.

EMBODIMENT 5

Two sheets of commercially available 2.5 mm thick, 230 mm long and 38 mm wide nesa glass were disposed in an evaporation device so that the alignment direction of leaves may be parallel to the longitudinal direction of the sheets of nesa glass. A spiral heater of tungsten was so disposed that the upper portion of the heater appears slightly above powders of SiO in a boat (34 mm in diameter) of molybdenum. The distance between the evaporation source and the louver was 41 cm and the distance $d_o$ between the louver and the sheet of nesa glass was 12 mm.

The leaves were made of a plate of nickel having the thickness of 0.4 mm and the leaf width of 20 mm with the leaf angles of 15° and leaf interval of 10 mm. The heater of tungsten was operated to heat at temperatures of about 1000° C and evaporate SiO at a pressure of $5 \times 10^{-4}$ Torr in the bell jar. The two evaporated sheets of substrate were divided and so disposed that the upper sheet of nesa glass may be orthogonal in a longitudinal direction to the lower sheet of nesa glass to provide an empty cell in cooperation with a spacer of 9 μm organic macromolecular film between the sheets of glass. The glass plates were adhesively fixed at their edge portions with an epoxy resin. A nematic liquid crystal (TN-200, made by Hoffmann la Roche) was injected into the empty cell to form a twisted liquid crystal display cell.

Figure 12A:
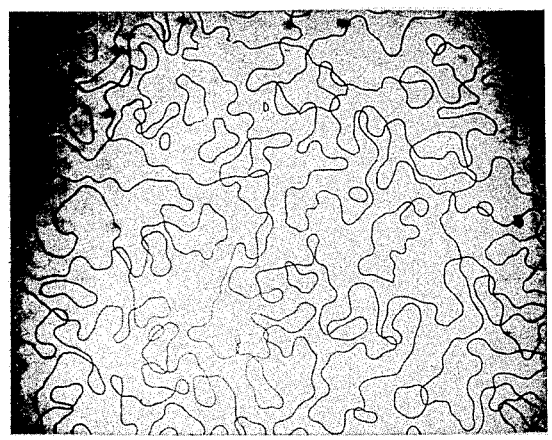
FIGS. 12a and 12b are photographs showing a state of orientation of a display cell produced by one embodiment.
Figure 12B:
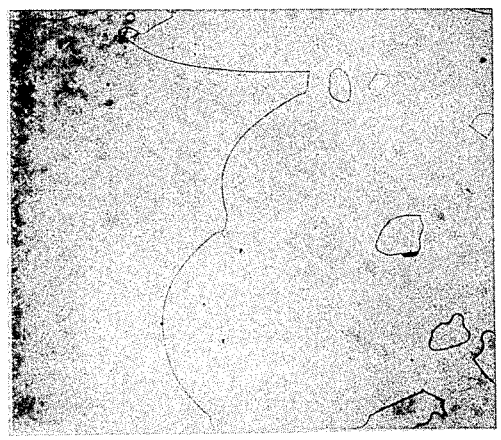

The cell was sandwitched by two sheets of polarizer in order to examine the states of orientation. FIG. 12a shows the states of orientation of a conventional liquid crystal display cell, and FIG. 12b shows those of the display cell according to the present invention. As is apparent from the photograph, the liquid crystal formed by the method of the present invention has the capability of uniform orientation with very excellent display characteristics.

EMBODIMENT 6

Figure 13:
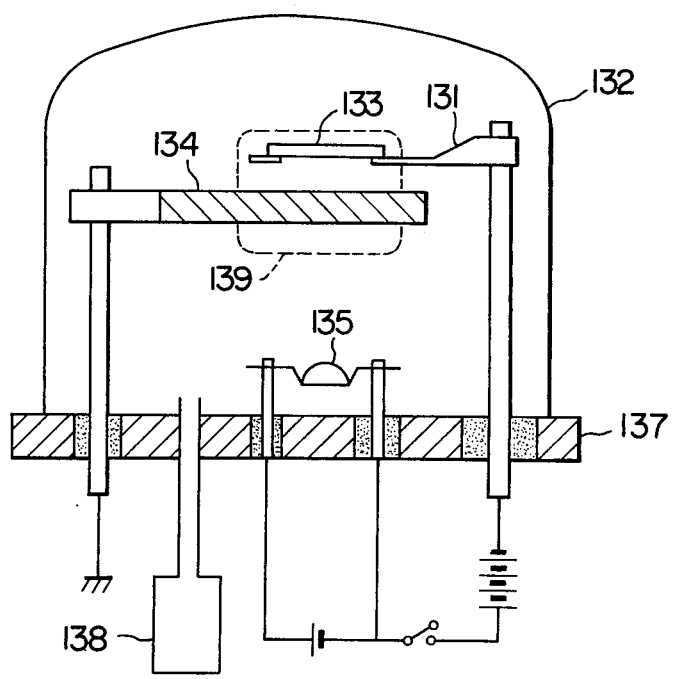
FIG. 13 is a cross-section showing a device for forming a thin film for alignment using an ion-plating method, illustrating one embodiment.

In the present Embodiment, the description will be given to a forming method of an alignment film also serving as an electrode using an ion plating method. Its device is schematically shown in FIG. 13. In the figure, within a vacuum container 132 there are provided a negatively chargeable substrate holder 131, a glass substrate 133, a louver 134 at a grounded potential, and a evaporation material 135 of indium. An atmosphere adjusting device 138 is coupled to a base 137 of the container to adjust the vacuum container 132 to an oxygen gas pressure of $5 \times 10^{-3}$ mmHg. The application of a voltage of $-2.0$ KV to the substrate holder 131 causes the formation of a glow discharge region in the proximity of the substrate. The heating of the evaporation source 135 causes particles of indium to pass through the louver 134, a portion of particles being ionized in the region of the glow discharge and deposited on the substrate in the form of indium oxide. The deposition for 15 minutes resulted in the formation of about 1000 A thick surfactant of indium oxide. The substrates were filled therebetween with a liquid crystal, to which an electrical signal was applied by electrical circuits in combination with an optical system. This assured the operations as a display device. The alignment film of the liquid crystal also serves as the electrode. The intrusion of the ionized particles to the surface of the substrate in the region of the glow discharge improved the adhesion of the film to the substrate.

EMBODIMENT 7

A 70 mm long and 220 mm wide substrate of soda glass was washed with trichloroethylene and acetone to remove therefrom fat and dust and disposed in the vacuum evaporation container (bell jar) 88 as shown in FIG. 8. A louver and a lateral lattice whose direction is orthogonal to the louver were disposed adjacent the substrate. The leaves constituting the louver have an angle of 30°, are 5 mm spaced and 10 mm wide, and the lateral lattice has a lateral width of 20 mm and a lattice interval of 5 mm. After the vacuum evaporation container 88 was reduced in pressure to a vacuum pressure of $2 \times 10^{-5}$ Torr, a gas of oxygen was leaked to set the vacuum pressure to $5 \times 10^{-3}$ Torr. Powders of indium oxide ($In_2O_3$) added with 5% by weight of powders of tin oxide ($SnO_2$) were moulded at a pressure of 50 kg/cm$^2$ to a cylindrical pellet of 15 mm$^\phi \times$ 10 mm', which was heated for about 7 minutes by electron beams for evaporation on the substrate. The formed thin film of indium oxide and tin oxide was $300 \pm 50$ A thick. The electrical resistance of the thin film was further measured by a four-probe-method, and it was 0.05 Ω·sq. Thus, the thin film exhibited an excellent conductivity.

The two above-mentioned substrates were combined in a similar manner to that in Embodiment 1 to provide a liquid crystal cell, into which a mixed liquid crystal of shiff base of propyl benzylidene cyano aniline and hexyl benzylidene cyano aniline in equal amounts by weight was injected.

A rectangular AC voltage signal of 1 KHz was applied in the same manner as in Embodiment 1 across the thin films of indium oxide and tin oxide respectively formed on the two substrates of the liquid cell to measure the voltage-brightness characteristic of the liquid crystal cell with the result of excellent characteristics, a threshold voltage of about 3 V, a voltage of about 5 V at which the transmission of light is saturated and a contrast of 200.

We claim:

1. A method of forming an alignment film of biaxial anisotropy which comes into contact with liquid crystal molecules to orient the liquid crystal molecules, comprising the steps of disposing a louver consisting of a plurality of leaves between the surface of a substrate on which the alignment film is to be formed and an evaporation source serving as a material for the alignment film, said leaves being arranged in parallel with one another and spaced from the surface of the substrate at an angle with respect thereto, and depositing particles evaporated from the evaporation source at reduced pressures on the surface of the substrate at angles of incidence of 45° to 75° through said louver.

2. A method according to claim 1, wherein said leaves constituting the louver are arranged at angles of 15° to 45° with respect to the surface of the substrate.

3. A method according to claim 1, wherein said particles evaporated from the evaporation source are deposited on the surface of the substrate at pressures of $1 \times 10^{-2}$ to $5 \times 10^{-5}$ mmHg.

4. A method according to claim 1, wherein a linear distance from the evaporaton source to the surface of the substrate is longer than the mean free path of the evaporated particles, and a linear distance of free space from the entrance of the louver to the surface of the substrate is shorter than the mean free path of the evaporated particles.

5. A method according to claim 1, wherein the particles evaporated from the evaporation source have mean free paths of 2 to 50 cm.

6. A method according to claim 1, wherein the leaves constituting the louver are arranged at angles of 15° to 45° with respect to the surface of the substrate and at angles of view of 10° to 60° defined by the adjacent leaves in the cross section of the leaf.

7. A method according to claim 1, wherein the alignment film deposited on the substrate is 50 to 600 a thick.

8. A method according to claim 1, wherein the film deposited on the substrate is an electrical insultor.

9. A method according to claim 1, wherein the film deposited on the substrate is made of one selected from indium and tin oxide.

10. A method of forming an alignment film of biaxial anisotropy which comes into contact with liquid crystal molecules to orient the liquid crystal molecules, comprising the steps of disposing a louver consisting of a plurality of leaves and a lateral lattice comprising a plurality of plates between the surface of a substrate on which the alignment film is to be formed and an evaporation source serving as a material for said alignment film, said leaves being arranged in parallel with one another and spaced from the surface of the substrate at an angle with respect thereto, disposing a plurality of lateral lattices intersecting perpendicularly to said leaves and having a perpendicular plane with respect to the surface of the substrate, and depositing particles evaporated from the evaporation source at reduced pressures on the surface of the substrate at angles of incidence of 45° to 75° through said lateral lattices and said louver.

11. A method according to claim 10, wherein said leaves constituting the louver are disposed at angles of 15° to 45° with respect to the surface of the substrate.

12. A method according to claim 10, wherein said particles are deposited on the surface of the substrate at pressures of $1 \times 10^{-2}$ to $5 \times 10^{-5}$ mmHg.

13. A method according to claim 10, wherein a linear distance from the evaporation source to the surface of the substrate is longer than the mean free path of the evaporated particles and a linear distance of free plane in the cross section of the louver from the entrance of the louver to the surface of the substrate is shorter than the mean free path of the evaporated particles.

14. A method of forming an alignment film of biaxial anisotropy which comes into contact with liquid crystal molecules to orient the liquid crystal molecules, comprising the steps of disposing a louver comprising a plurality of leaves between the surface of a substrate on which the alignment film is to be formed and an evaporation source serving as a material for said alignment film, said leaves being arranged in parallel with one another and spaced from the surface of the substrate at an angle with respect thereto, and depositing particles evaporated from the evaporation source at reduced pressures in the presence of a glow discharge region in the proximity of the surface of the substrate on the surface of the substrate at angles of incidence of 45° to 75° through said louver.

* * * * *